United States Patent [19]

Mikhailov et al.

[11] 4,045,533

[45] Aug. 30, 1977

[54] METHOD OF MANUFACTURING PRESTRESSED REINFORCED CONCRETE ARTICLES

[76] Inventors: Viktor Vasilievich Mikhailov, ulitsa Chkalova, 25, kv. 14; Semen Lvovich Litver, Bolshaya Pirogovskaya, 37/43, Korpus A, kv. 32; Alexandr Konstantinovich Karasev, ulitsa Georgiu Dezh, 2/I, kv. 192, all of Moscow, U.S.S.R.

[21] Appl. No.: 323,823

[22] Filed: Jan. 15, 1973

Related U.S. Application Data

[63] Continuation of Ser. No. 56,948, July 21, 1970, abandoned.

[51] Int. Cl.$^2$ .................. B28B 1/00; B28B 11/00
[52] U.S. Cl. .................. 264/228; 264/333; 264/347; 264/DIG. 43; 264/DIG. 59
[58] Field of Search .............. 106/109, 118, 89, 102, 106/103, 104, 100; 264/DIG. 43, 228, 333, 345

[56] References Cited

U.S. PATENT DOCUMENTS

| | | | |
|---|---|---|---|
| 732,674 | 6/1903 | Bell et al. | 264/DIG. 43 |
| 1,986,335 | 1/1935 | Halbach | 106/89 |
| 3,155,526 | 11/1964 | Klein | 106/103 |
| 3,251,701 | 5/1966 | Klein | 106/104 |
| 3,303,037 | 2/1967 | Klein | 106/89 |
| 3,447,937 | 6/1969 | Hersey et al. | 106/102 X |
| 3,565,648 | 2/1971 | Mori et al. | 106/89 |

OTHER PUBLICATIONS

Desch and Lea, Chemistry of Cement and Concrete, Arnold, London (1956), pp. 151, 398, 408–410, 420–422, 431, 432 & 437.

Weast et al., Handbook of Chemistry and Physics, Chem. Rubber Co., Cleveland (1972) p. B-76.

*Primary Examiner* — Willard E. Hoag

[57] ABSTRACT

A method of making stressed concrete articles made from a cement containing as an additive to portland cement a mixture of alumina cement, calcium sulfate and ground caustic lime, the method including hydrothermal treatment at 50° C or above followed by curing in cold water for several days.

4 Claims, No Drawings

METHOD OF MANUFACTURING PRESTRESSED REINFORCED CONCRETE ARTICLES

This application is a continuation of copending application Ser. No. 56,948, filed July 21, 1970 and now abandoned.

The present invention relates to methods of manufacturing prestressed reinforced concrete articles and structures used under the conditions of high humidity, such as pressure pipes, tanks, joints of underground structures and other thin-walled constructions.

Known in the art is a method of manufacturing prestressed reinforced concrete articles from stressing cement containing portland cement and an expanding agent.

The expanding agent of the stressing cement is essentially a mixture of calcium sulphate and a substance containing calcium aluminates.

The stressing cement possesses an expanding energy capable of creating in the reinforced concrete an inner volumetric stress of tension in the reinforcement metal and of compression in the concrete (selfstressing).

The method of manufacturing prestressed reinforced concrete articles consists in the following: articles are moulded, cured until their strength reaches 150-200 kg/cm², stripped and subjected to hydrothermal treatment at a temperature not below 50° C for 8-10 hours, whereupon they are kept in water for 7-12 days until the process of selfstressing or pre-stressing is completed.

A disadvantage of the conventional method is that the articles are subjected to the hydrothermal treatment and kept in water for a too long period of time, and the values of the final strength (300-400 kg/cm²) and selfstressing (20-40 kg/cm²) of the concrete are small.

It is an object of the present invention to eliminate the afore-mentioned disadvantages.

The present invention has as an object the provision of a method of manufacturing prestressed reinforced concrete articles employing such a binder that would make it possible to decrease the duration of the hydrothermal treatment of articles and their storage in water, as well as to considerably increase the energy of the concrete selfstressing and strength.

This objective is accomplished in that when manufacturing prestressed reinforced concrete articles from stressing cement made as mixture of portland cement with an expanding agent containing calcium sulphate and a substance with calcium aluminates by way of moulding articles, curing them until they acquire a stripping strength, stripping them, subjecting the articles to hydrothermal treatment at a temperature which is not below 50° C, and subsequent storing of said articles in water, According to the invention, the binder is essentially stressing cement whose expanding agent contains calcium oxide, the hydrothermal treatment of the articles is carried out for 1-4 hours and they are subsequently stored in water for 3-4 days.

In cases when the process of concrete expansion and selfstressing is to be completed in the course of hydrothermal treatment of the articles, the hydrothermal treatment is carried out at a temperature of 50°-90° C for 2-4 hours.

In cases when the process of concrete expansion and selfstressing is to be completed when the articles are kept in water, the hydrothermal treatment is carried out at a temperature of 90°-100° C for 1-2 hours.

Given below is the detailed description of the invention.

The subject-matter of the present invention consists in that when manufacturing prestressed rainforced concrete articles use is made of stressing cement whose expanding agent contains calcium oxide.

It is known that expansion and selfstressing of a structure made from the fact stressing cement results from that first calcium hydrosulphoaluminate of a low sulphate form is formed in the cement stone, whereupon it is rectystallized into a high sulphate form. Introduction of calcium oxide into the expanding agent results in a fast reduction of the amount of free water in the cement stone and strengthening of the processes of formation of a low sulphate form of calcium hydrosulphoaluminate. In the course of its recrystallization into a high sulphate form of calcium hydrosulphoaluminate, the great amount of the latter leads to a considerable increase of the energy of the concrete selfstressing (up to 80 kg/cm²) and strength (over 400 kg/cm²)

To obtain a great value of the selfstressing along with a great strength, it is necessary to control the process of the cement expansion properly, which depends on the three following factors: amount of the components used, amount of the water and temperature of the medium.

A low sulphate form is quickly formed after the concrete mixture prepared from stressing cement is mixed with water, whereupon, provided there are not obstacles, it is quickly recrystallized into a high sulphate form. At temperatures of hardening exceeding 80° C the high sulphate form of calcium hydrosulphoaluminate is produced but in small amounts. However, the main obstacle for the formation of the high sulphate form is introduction into the reaction products of calcium oxide which absorbs a part of the mixing water, as a result of which the amount of water in the system is not sufficient for recrystallization.

Therefore, during the hydrothermal treatment of articles at a temperature of 50-90° C for 2-4 hours there takes place a relatively quick recrystallization of the low sulphate form of calcium hydrosulphoaluminate into its high sulphate form, and the process of the concrete expansion and selfstressing is completed relatively quickly.

During the hydrothermal treatment of articles at a temperature of 90°-100° C for 1-2 hours, such recrystallization is hampered and takes place later when the articles are stored in water during a prolonged period of time.

Since the introduction of calcium oxide considerably decreases the total time of recrystallization of the low sulphate form of calcium hydrosulphoaluminate into the high sulphate form, the time period during which the articles are kept in water after the hydrothermal treatment until the completion of the process of the concrete expansion and selfstressing is considerably decreased too.

To make the subject-matter of the present invention readily understood, given below are specific examples of carrying the present method into effect.

EXAMPLE 1

Pipes having a diameter of 500 mm and provided with wire cylindrical reinforcement were moulded from a sand-cement concrete mixture.

The concrete mixture had the following composition (relative to the weight of the cement):

| | |
|---|---|
| 1. Stressing cement | 1 |
| 2. Mortar sand F.M.2.1 | 1 |
| 3. Water | 0.35 |

The stressing cement contained the following initial materials (by weight percent):

| | |
|---|---|
| 1. Portland cement | 62 |
| 2. Alumina cement | 20 |
| 3. Ground gypsum | 13 |
| 4. Ground caustic lime | 5 |

The initial materials had the following chemical composition:

| No. Initial No. Material | Losses occurring during calcination | $SiO_2$ | $Fe_2O_3$ | $Al_2O_3$ | CaO | MgO | $SO_3$ | $K_2O$ | $Na_2O$ |
|---|---|---|---|---|---|---|---|---|---|
| 1. Portland cement | 1.47 | 23.04 | 3.21 | 7.48 | 59.60 | 3.55 | 1.07 | 0.45 | 0.13 |
| 2. Alumina cement | 9.96 | 10.20 | 1.63 | 8.48 | 36.81 | 1.02 | 1.85 | 0.05 | 0.00 |
| 3. Gypsum | 9.08 | 5.45 | 0.25 | 0.73 | 33.90 | 2.47 | 48.12 | 0.00 | 0.00 |
| 4. Lime | 27.91 | 3.89 | 0.18 | 0.46 | 66.46 | 0.60 | 0.30 | 0.150 | 0.05 |

The specific surface of the stressing cement was 5,000 $cm^2/gr$.

To control the quality of the concrete in articles (pipes), test samples, i.e. 3×3×10 cm prisms and 3×3×3 cm cubes, were moulded from the concrete of the afore-said composition by way of slight vibration.

The first measurement of the length and strength of the samples was made at the moment the articles were stripped. Subsequent measurements were carried out daily.

The test samples were subjected to the treatment along with pipes.

The newly moulded reinforced concrete pipes were kept in moulds under dry air conditions (in the shop) for 18-24 hours at a temperature of 20° C until the concrete strength reached 150-200 kg/cm², sufficient for the articles to be stripped.

After they have been stripped, the pipes were placed into chambers for hydrothermal treatment in hot water at a temperature of 80°-85° C during 3 hours.

Then, the pipes were placed into chambers with cold water (the temperature of the water equalling that of the shop room), in which they were kept for 4 days.

After this, the pipes were subjected to inner hydraulic pressure and delivered to storage or ready products.

As a result of the concrete expansion in the hardened state, the steel reinforcement acquired a tensile stress, whereas a compression stress, i.e. selfstressing was produced in the concrete.

When tested for destruction, such pre-stressing pipes sustained water pressure up to 19 atm.

The most typical physical and mechanical characteristics of the test samples are given in Table 1.

Table 1

| Concrete Characteristics | Age of Samples in Days | | | | |
|---|---|---|---|---|---|
| | 1 | 3 | 7 | 14 | 28 |
| Free Expansion, in %% | 0.85 | 3.92 | 4.21 | 4.32 | 4.32 |
| Strength, in kg/cm² | 192 | 221 | 250 | 357 | 462 |
| Pre-pressing in Kg/cm² | 24 | 69 | 75 | 78 | 81 |

Table 1-continued

| Concrete Characteristics | Age of Samples in Days | | | | |
|---|---|---|---|---|---|
| | 1 | 3 | 7 | 14 | 28 |

Pipes can be manufactured from the concrete of the afore-said composition under other conditions of the hydrothermal treatment, for example, at 95° C for 1 hour. In this case the final results of the pre-stressing and free expansion will be almost the same, and the concrete strength will be by 10-20% greater (see Table 2).

Table 2

| Concrete Characteristics | Age of samples in days | | | | |
|---|---|---|---|---|---|
| | 1 | 3 | 7 | 14 | 28 |
| Free expansion, in %% | 0.25 | 3.85 | 4.00 | 4.03 | 4.51 |
| Strength, in kg/cm² | 286 | 312 | 350 | 461 | 532 |
| Pre-stressing in kg/cm² | 16 | 58 | 67 | 68 | 78 |

As it is seen from Tables 1 and 2, the processes of the concrete expansion and pre-stressing during the hydrothermal treatment at a temperature of 80°-85° C for 3 hours take place principally in the course of the hydrothermal treatment rather than during the hydrothermal treatment at a temperature of 95° C for 1 hour when the processes of the free expansion and selfstressing are rather extended in time and take place when the articles are being kept in cold water.

EXAMPLE 2

Pipes and test samples were manufactured in accordance with the afore-described technology from a concrete mixture containing the following components (taken relative to the weight of the cement):

| | |
|---|---|
| 1. Stressing cement | 1 |
| 2. Mortar sand with F.M. (fineness modulus) 2.1 | 2 |
| 3. Water | 0.4 |

The stressing cement had the same composition as in EXAMPLE 1.

The hydrothermal treatment of the articles was carried out at a temperature of 100° for 2 hours.

When tested for destruction, the pipes sustained an inner pressure up to 14 atm.

The most typical physical and mechanical characteristics of the concrete are given in Table 3.

Table 3

| Concrete Characteristics | Age of Samples in Days | | | | |
|---|---|---|---|---|---|
| | 1 | 3 | 7 | 14 | 28 |
| Free Expansion, in %% | 0.26 | 2.98 | 4.57 | 4.32 | 4.81 |
| Strength, in kg/cm² | 248 | 282 | 350 | 392 | 422 |

Table 3-continued

| Concrete Charac- | Age of Samples in Days | | | | |
|---|---|---|---|---|---|
| teristics | 1 | 3 | 7 | 14 | 28 |
| Pre-stress, in kg/cm² | 16 | 27 | 36 | 43 | 49 |

As it is seen from the afore-given table, use of the stressing cement with addition of calcium oxide in the expanding agent makes it possible to obtain in the concrete of this composition a value of prestress of 49 kg/cm², which is approximately 1.5 times greater than the value of pre-stress of the concrete prepared from stressing cement without calcium oxide.

EXAMPLE 3

Pipes and test samples were manufactured also in accordance with the above-described technology from a concrete mixture containing the following components (taken relative to the weight of the cement):

| | |
|---|---|
| 1. Stressing cement | 1 |
| 2. Mortar sand with F.M. (fineness modulus) 2.6 | 0.5 |
| 3. Crushed granite with the maximal size of pieces up to 15 mm | 1 |
| 4. Water | 0.4 |

The stressing cement had the same composition as in EXAMPLE 1.

The hydrothermal treatment of the articles was carried out at a temperature of 90° C for 2 hours.

The most typical physical and mechanical characteristics of the concrete are given in Table 4.

Table 4.

| Concrete | Age of Samples in Days | | | | |
|---|---|---|---|---|---|
| Characteristics | 1 | 3 | 7 | 14 | 28 |
| Free Expansion, in %% | 0.31 | 2.10 | 2.40 | 2.55 | 2.6 |
| Strength, in kg/cm² | 220 | — | 390 | — | 429 |
| Pre-stress, in kg/cm² | 17.6 | 34.4 | 37.8 | — | 41.0 |

EXAMPLE 4.

Pipes and test samples were manufactured in accordance with the technology as described in Example 1 from a concrete mixture of the following comparative composition:

| | |
|---|---|
| 1. Stressing cement | 1 |
| 2. Mortar sand with F.M. (fineness modulus) 2.6 | 2 |
| 3. Crushed granite with the maximal size of pieces up to 15 mm | 4 |
| 4. Water | 0.5 |

The hydrothermal treatment the articles was carried out at a temperature of 50° C for 4 hours.

The most typical physical and mechanical characteristics of the concrete are given in Table 5.

Table 5

| Concrete | Age of Samples in Days | | | | |
|---|---|---|---|---|---|
| Characteristics | 1 | 3 | 7 | 14 | 28 |
| Free Expanson, in %% | 0.95 | 1.85 | 1.90 | 1.90 | 1.90 |
| Strength, in kg/cm² | 216 | — | 365 | — | 440 |
| Pre-stress in kg/cm² | 8.6 | 14.8 | 15.1 | 15.1 | 15.1 |

The examples, of carrying the present method into effect, cited in the description, show that it makes it possible to manufacture prestressed reinforced concrete articles with high physical and mechanical characteristics, and to considerably decrease the time of the main technological operations.

What is claimed is:

1. A method of manufacturing prestressed reinforced concrete articles, consisting essentially of the following operations: moulding the articles from a concrete containing a stressing cement mixture of Portland cement with an added expanding component consisting essentially of a mixture of calcium sulphate, calcium aluminates and calcium oxide; curing the articles until they acquire a stripping strength; stripping said articles, subjecting said articles to hydrothermal treatment under water at a temperature which is not below 50° C for 1–4 hours, and subsequently keeping said articles in cold water for 3–4 days.

2. A method according to claim 1, wherein the hydrothermal treatment at a temperature of 50°–90° C is carried out during 2–4 hours.

3. A method according to claim 1, wherein the hydrothermal treatment at a temperature of 90°–100° C is carried out during 1–2 hours.

4. A method as claimed in claim 1 wherein the ingredients of said stressing cement consist of 62% by weight Portland cement, 20% by weight alumina cement, 13% by weight calcium sulfate and 5% by weight ground caustic lime.

* * * * *